US012482869B2

(12) United States Patent
Johnson et al.

(10) Patent No.: US 12,482,869 B2
(45) Date of Patent: Nov. 25, 2025

(54) EQUIPMENT MANAGEMENT VIA MESH NETWORK

(71) Applicant: Briggs & Stratton, LLC, Wauwatosa, WI (US)

(72) Inventors: Todd Johnson, Wauwatosa, WI (US); Mark Noller, Milwaukee, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 623 days.

(21) Appl. No.: 17/797,575

(22) PCT Filed: Feb. 5, 2021

(86) PCT No.: PCT/IB2021/050966
§ 371 (c)(1),
(2) Date: Aug. 4, 2022

(87) PCT Pub. No.: WO2021/156824
PCT Pub. Date: Aug. 12, 2021

(65) Prior Publication Data
US 2023/0053421 A1     Feb. 23, 2023

Related U.S. Application Data

(60) Provisional application No. 62/970,946, filed on Feb. 6, 2020.

(51) Int. Cl.
*H04W 4/70*     (2018.01)
*H01M 10/42*    (2006.01)
(Continued)

(52) U.S. Cl.
CPC ....... *H01M 10/425* (2013.01); *H01M 10/482* (2013.01); *H01M 50/204* (2021.01);
(Continued)

(58) Field of Classification Search
CPC .......... H04W 4/70; H04W 4/80; H04W 84/18
(Continued)

(56) References Cited

U.S. PATENT DOCUMENTS 9,747,057 B1   8/2017   Ramani et al.
9,752,840 B1   9/2017   Betro
(Continued)

FOREIGN PATENT DOCUMENTS

DE   10 2017 122 733 A1   4/2019
WO   WO-2017003338 A1 *   1/2017   ......... H04L 67/5681
WO   WO-2019/006452       1/2019

OTHER PUBLICATIONS

PCT International Search Report and Written Opinion dated May 18, 2021 in International Application No. PCT/IB2021/050966, mail date May 18, 2021, 19 pps.
(Continued)

*Primary Examiner* — Joseph Arevalo
(74) *Attorney, Agent, or Firm* — Foley & Lardner LLP

(57) ABSTRACT

A battery pack includes a housing, rechargeable lithium-ion battery cells, a positive terminal, a negative terminal, a data terminal, a battery management system, and an Internet of Things (IoT) module. The data terminal includes at least one data pin that is configured to receive operational information from a piece of equipment coupled with the battery pack. The IoT module is in communication with the data terminal and the battery management system, and is configured to receive operational information about the piece of equipment from the data terminal, receive operational information about the rechargeable lithium-ion battery cells from the battery management system, and transmit the operational information about the piece of equipment and the operational information from the lithium-ion battery cells via a network interface. The network interface is configured to communicate the operational information about the piece of
(Continued)

equipment and the operational information about the rechargeable lithium-ion battery cells to a mesh network, and is configured to communicate over at least two frequencies.

20 Claims, 7 Drawing Sheets

(51) Int. Cl.
*H01M 10/48* (2006.01)
*H01M 50/204* (2021.01)
*H01M 50/296* (2021.01)
*H02J 7/00* (2006.01)
*H04W 84/18* (2009.01)

(52) U.S. Cl.
CPC ......... *H01M 50/296* (2021.01); *H02J 7/0013* (2013.01); *H04W 4/70* (2018.02); *H01M 2010/4271* (2013.01); *H01M 2010/4278* (2013.01); *H04W 84/18* (2013.01)

(58) Field of Classification Search
USPC .................. 455/419, 456.1, 552.1, 566, 574; 370/252; 700/117
See application file for complete search history.

(56) References Cited

U.S. PATENT DOCUMENTS

| | | |
|---|---|---|
| 2015/0372518 A1 | 12/2015 | Toya et al. |
| 2017/0033408 A1* | 2/2017 | O'Hora ................ H02J 7/0048 |
| 2019/0339688 A1 | 11/2019 | Cella et al. |
| 2020/0058963 A1* | 2/2020 | Morris ................ H02J 7/00043 |

OTHER PUBLICATIONS

Pham Van Dai et al: "Method for Organizing Mesh Topology based on LoRaTechnology", 2018 10th International Congress on Ultra Modern Telecommunications and Control Systems and Workshops (ICUMT), IEEE, Nov. 5, 2018 (Nov. 5, 2018), pp. 1-6, XP033511362, DOI: 10.1109/ICUMT.2018.8631270 [retrieved on Jan. 31, 2019]* Sections I and III*.

* cited by examiner

EQUIPMENT MANAGEMENT VIA MESH NETWORK

CROSS-REFERENCE TO RELATED APPLICATION

This Application is a National Stage Application of PCT Application No. PCT/IB2021/050966, filed on Feb. 5, 2021, which claims the benefit of U.S. Provisional Patent Application No. 62/970,946, filed Feb. 6, 2020, both of which are hereby incorporated herein by reference in their entireties.

BACKGROUND

The present invention generally relates to the field of indoor and outdoor equipment, and in particular, to a network connecting the indoor and outdoor equipment.

SUMMARY

One exemplary embodiment relates to a battery pack. The battery pack includes a housing, rechargeable lithium-ion battery cells received within the housing, a positive terminal, a negative terminal, a data terminal, a battery management system, and an Internet of Things (IoT) modules. The rechargeable lithium-ion battery cells are received within the housing. The positive terminal and the negative terminal are in selective communication with the plurality of rechargeable lithium-ion battery cells and are configured to transmit electrical power from the rechargeable lithium-ion battery cells to a piece of equipment coupled with the battery pack. The data terminal includes a data pin that is configured to receive operational information from the piece of equipment coupled with the battery pack. The battery management system is configured to monitor the rechargeable lithium-ion battery cells and selectively couple the rechargeable lithium-ion battery cells to the positive terminal and the negative terminal to selectively permit electrical power to flow from the rechargeable lithium-ion battery cells to the positive terminal and the negative terminal. The IoT module is in communication with the data terminal and the battery management system, and is configured to receive operational information about the piece of equipment form the data terminal, receive operational information about the rechargeable lithium-ion battery cells from the battery management system, and transmit the operational information about the piece of equipment and the operational information about the rechargeable lithium-ion battery cells via a network interface. The network interface is configured to communicate the operational information about the piece of equipment and the operational information about the rechargeable lithium-ion battery cells to a mesh network. The network interface is configured to communicate over at least two different frequencies.

Another exemplary embodiment relates to an IoT module. The IoT module includes a processing circuit and a network interface. The processing circuit includes a processor and a memory, and is configured to receive operational data from a piece of equipment associated with the IoT module. The network interface is in communication with the processing circuit, and is configured to receive the operational data from the processing circuit and communicate the operational data from the piece of equipment associated with the IoT module using transceivers configured to communicate over at least two frequencies. The memory is structured to store instructions that are executable by the processor and cause the processing circuit, with the network interface, to store operational data from the piece of equipment physically and communicably coupled to the IoT module, transmit the operational data to a second module device using a first frequency, and transmit the operational data to a mesh network using a second frequency.

Another exemplary embodiment relates to an equipment management system. The equipment management system includes at least a first power equipment and a second power equipment, a first IoT module, and a second IoT module. The first IoT module is operably coupled to the first power equipment and is configured to receive and transmit operational parameters of the first power equipment over a first frequency and a second frequency. The second IoT module is operably coupled to the second power equipment and is configured to receive and transmit operational parameters of the second power equipment over the first frequency and the second frequency. The first IoT module is configured to communicate operational data from the first power equipment to the second IoT module over the first frequency. The first IoT module is configured to communicate operational data to a mesh network over the second frequency. The first IoT module is configured to receive operational data from the second power equipment from the second IoT module and transmit the operational data from the second power equipment to the mesh network over the second frequency.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, a communication system or network for power equipment is provided. The management system includes various types of power equipment and battery packs that include communication modules. The communication modules are configured to send and/or receive information from the equipment itself, as well as information from other pieces of power equipment and/or battery packs within the network. The communication modules can transmit information to other pieces of equipment or to the network itself via one or more communication protocols. The communication modules can be removably coupled to the battery packs, fixedly coupled to the battery packs, removably coupled to the power equipment, fixedly coupled to the power equipment, or various different combinations of these.

The management system for equipment described herein may be for equipment including outdoor power equipment, such as riding tractors, snow throwers, pressure washers, tillers, log splitters, zero-turn radius mowers, walk-behind mowers, riding mowers, or pavement surface preparation devices. The equipment may also include industrial vehicles, such as forklifts, utility vehicles, or commercial turf equipment, such as blowers, vacuums, debris loaders, overseeders, power rakes, aerators, sod cutters, brush mowers, sprayers, spreaders, etc. Equipment may also include types of vehicles such as all-terrain vehicle (ATVs) and other off-road vehicles (ORVs). The equipment management system and mesh network described herein may additionally be used with equipment that uses a gasoline powered internal combustion engine. Furthermore, the equipment management system described herein can be utilized with outdoor or indoor equipment that are powered by hybrid systems (e.g., systems powered by an internal combustion engine and generator or systems powered by an internal combustion engine, a generator, and a battery).

Figure 1:
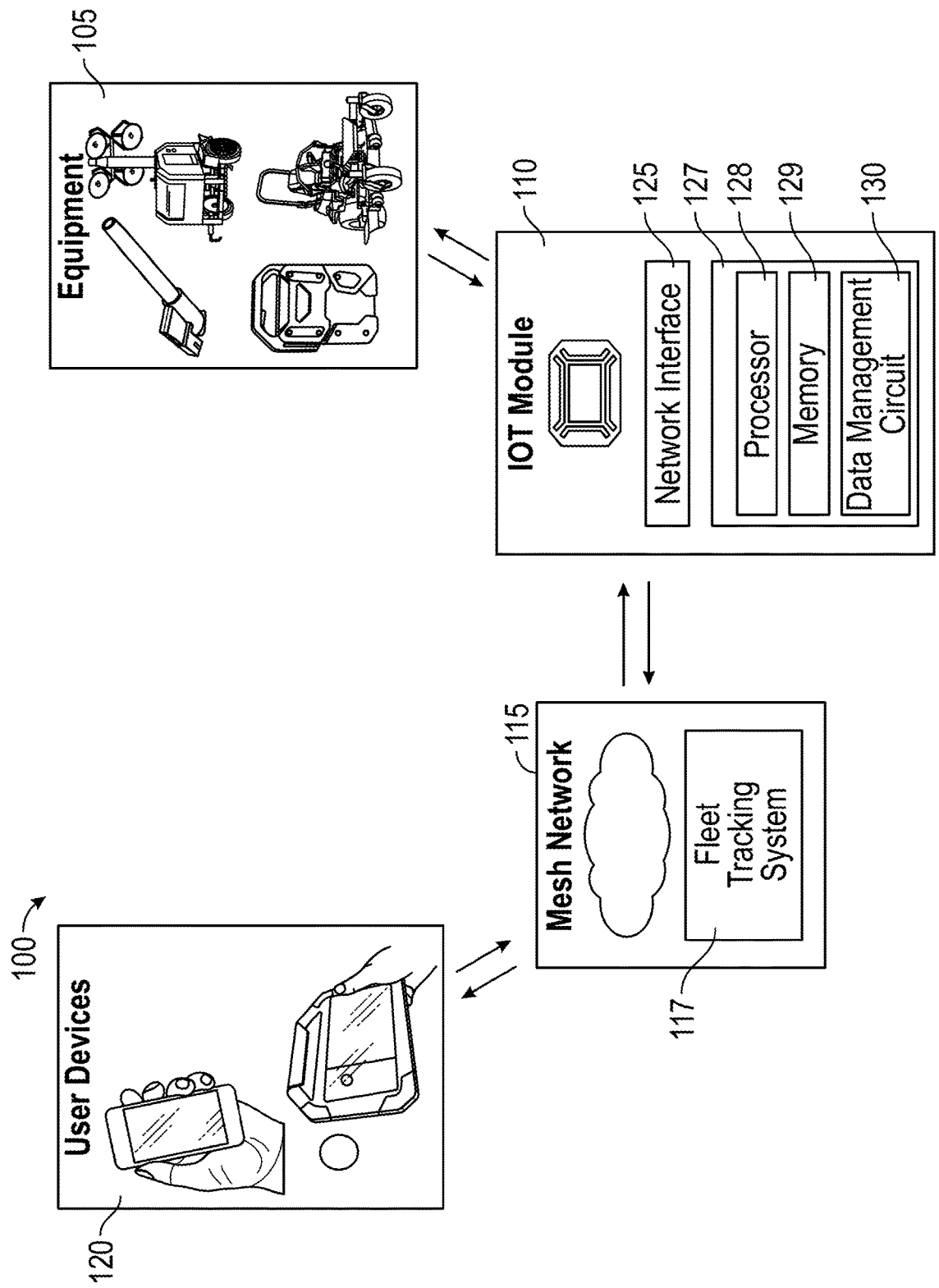
FIG. 1 is a schematic view of an equipment management system using Internet of Things (IoT) via a mesh network, according to an exemplary embodiment.

Referring to FIG. 1, a schematic view of an equipment management system 100 is shown, according to an exemplary embodiment. The equipment management system 100 is an Internet of Things (IoT) system that enables connectivity of various types of outdoor and indoor equipment to a mesh network. Such equipment may be battery-powered or engine-powered equipment. The equipment management system 100 integrates hardware, software, network, cloud, client applications, and mobile devices together such that users may easily access and send data on a large scale of equipment to a cloud. Furthermore, original equipment manufacturers (OEMs) may incorporate and leverage third-party services, such as cloud analytic programs, with the equipment management system 100. As such, user interfaces can be generated for client applications that convey meaningful information from the equipment management system 100. The equipment management system 100 is configured to be product-agnostic, such that benefits of a capability to transmit/receive data from the mesh network 115 can be incorporated with any type of equipment 105. The equipment management system 100 is not restricted to use with equipment 105 that operate on power from a battery. Furthermore, users of the equipment management system 100 may be able to view updated information regarding equipment 105 (e.g., mowers in a tracked fleet of outdoor power equipment) at a faster rate. A cloud-based IoT system integrated with the mesh network 115 of the equipment management system 100 can provide greater opportunities to users in accessing and managing data on operation of equipment 105. Additionally, by using a cloud-based mesh network 115, the equipment management system 100 is serverless. Therefore, the equipment management system 100 may have improved flexibility. The equipment management system 100 may also be more easily scaled down or up to accommodate more or less products (e.g., equipment 105) and/or to include varying levels of cost accessibility.

The equipment management system 100 includes user devices 120, a mesh network 115, one or more IoT modules 110, and equipment 105. The user devices 120 may include devices such as a smartphone, a personal computer, a desktop computer, a tablet, a smartwatch, etc. In some embodiments, the user devices 120 include other mobile, computing devices that may be operated by a user (e.g., an operator of equipment 105, a manager of the fleet tracking system 117, etc.). The IoT modules 110 can be coupled directly to and/or positioned on the equipment 105 (which can include battery packs).

Data communication between the equipment 105 and user devices 120 in various combinations may be facilitated by the mesh network 115. In some arrangements, the mesh network 115 sends and receives cellular communications. In another arrangement, the mesh network 115 includes the Internet. In yet another arrangement, the mesh network 115 includes a local area network (LAN) or a wide area network (WAN). The mesh network 115 may be facilitated by short and/or long range communication technologies including Bluetooth transceivers, Bluetooth beacons, RFID transceivers, NFC transceivers, Wi-Fi transceivers, cellular transceivers, wired network connections, etc. As such, in one embodiment, the communication between the user devices 120 and the equipment 105 can be facilitated by and connected to a cloud-based system via RFID and Wi-Fi connections of the equipment 105 (e.g., physically and communicably coupled IoT modules 110). In another embodiment, the communications can be facilitated by and connected to a cloud-based system via Wi-Fi only. In another embodiment, the communications can be facilitated by and connected to a cloud-based system via cellular transceivers. In yet another embodiment, the communications can be facilitated by and connected to a cloud-based system via Bluetooth and cellular transceivers. In all such embodiments, the cloud-based system can be made accessible to a third party, such as a consumer and/or rental company.

The mesh network 115 is communicably coupled to one or more pieces of equipment 105 via the IoT modules 110. Although a single IoT module 110 is shown, this is for illustrative purposes only, and the equipment management system 100 includes an IoT module 110 for each piece of equipment 105 connected in the equipment management system 100. In some examples, each battery pack (e.g., the battery pack 600, shown in FIG. 6) within the system includes an IoT module 110, while each piece of power equipment (e.g., lawnmowers, light towers, etc.) includes an interface to receive the battery pack, which provides information to the IoT module 110 about both the battery and the equipment 105 that is being powered by the battery. The IoT modules 110 are structured to connect to the cloud-based mesh network 115 to communicate operational data of the equipment 105. In some embodiments, the IoT modules 110 include a network interface 125. In some arrangements, the network interface 125 includes the hardware and logic necessary to communicate over multiple channels of data communication. For example, the network interface 125 may include a Wi-Fi interface, a cellular modem, a Bluetooth transceiver, a Bluetooth beacon, an RFID transceiver, a NFC transceiver, an Ethernet transceiver, a Long Range (LoRa) low power radio frequency transceiver, a 915 megahertz (MHz) transceiver, or a combination thereof. In some embodiments, the components of the network interface 125 depends on a configuration of the IoT module 110. For example, the network interface 125 of an economical device and/or mid-level device IoT module 110 may include at least a Bluetooth transceiver and/or a 915 MHz transceiver. In a different configuration, the network interface 125 of a gateway device IoT module 110 may include at least the Bluetooth transceiver and a cellular radio. In some embodiments, the network interface 125 of a gateway device IoT module 110 also includes a WiFi interface and/or a LoRa radio frequency transceiver. A mesh network communication protocol can operate on a Bluetooth transceiver of the network interfaces 125 of each IoT module 110.

The network interface 125 facilitates data communication to and from the equipment 105. In some embodiments, each of the IoT modules 110 are standardized. In response to being within a communication range of a new IoT module 110, an IoT module 110 can be structured to recognize and communicate (via the respective network interface 125) with the new IoT module 110. As such, the IoT modules 110 can be scalable in the equipment management system 100. The IoT modules 110 can communicate wirelessly with multiple other devices, including other IoT modules 110, network interfaces integrated with a controller of equipment 105, etc., in a mesh network utilizing an internet of things (IoT) system. In some embodiments, the IoT modules 110 may receive software updates over the mesh network 115 via the network interface 125. In some embodiments, the external device with which IoT module 110 communicates is a charging station, via a wireless gateway of the charging station. The IoT module 110 may communicate information with the charging station regarding a status of equipment 105 (e.g., currently charging, fully charged, ready to use, reserved), according to some embodiments. In other embodiments, the IoT modules 110 may communicate with a wireless gateway in a portable charger. In other embodiments, the network interface 125 is a communication interface that allows the equipment 105 to serially communicate with the external device via SPI (serial peripheral interface), I2C (inter-integrated circuit), USB (universal serial bus), etc., or any other serial communications protocol. The network interface 125 may include an IoT gateway (e.g., if the IoT module 110 is a gateway device 113 (FIG. 3)).

The IoT module 110 further includes a processing circuit 127. The processing circuit is shown to include a processor 128 and a memory 129. The processor 128 may be general purpose or specific purpose processor, an application specific integrated circuit (ASIC), one or more field programmable gate arrays (FPGAs), a group of processing components (e.g. parallel processing units), a neural network processing system, or other applicable processing circuits. The processor 128 may be configured to execute computer code or instructions stored in memory 129 or received from other computer readable media, such as physical media (e.g. CD-ROM, DVD-ROM, flash drive, etc.), network drives, remote servers, mobile devices, etc. The memory 129 may include one or more devices (e.g. memory units, memory devices, storage devices, etc.) for storing data and/or computer code for completing and/or facilitating the functions and processes described in the present disclosure. The memory 129 may include random access memory (RAM), read-only memory (ROM) hard drive storage (physical or solid state), temporary storage, non-volatile memory, flash memory, optical memory, or any other suitable memory component for storing software objects and/or computer instructions. The memory 129 may include database components, object code components, script components, or any other type of information structure for supporting the various functions and information structures described in the present disclosure. The memory 129 may be communicably connected to the processor via the processing circuit 127 and may include computer code for executing (e.g. by the processor) one or more processes described herein.

The IoT modules 110 further include a data management circuit 130. The data management circuit 130 may be structured to store, utilizing memory 129, operational data of the piece of equipment 105 physically and communicably coupled to the IoT module 110. Furthermore, the data management circuit 130 may be structured to transmit, via the network interface 125, the operational data to one or more other IoT modules 110 or the mesh network 115. In some embodiments, the data management circuit 130 is structured to detect a loss of cellular communication to the mesh network 115. In response to detecting the loss of cellular communication, the data management circuit 130 may determine whether the memory 129 has enough available storage to save the operational data until connection to the mesh network 115 is re-established. As such, the data management circuit 130 is configured to determine how much available storage remains in the memory 129. In response to determining the memory 129 does not have enough available storage, the data management circuit 130 can be structured to rewrite more outdated memory to save more recent operational data. The data management circuit 130 may also be configured to determine how often and/or at what time the IoT modules 110, via the network interface 125, should transmit updated operational data to the mesh network 115. For example, the data management circuit 130 may be configured to push updates to a cloud integrated with the mesh network 115 at the end of a certain time period (e.g., day, hour) and/or during or at the completion of a job, etc. In some embodiments, the data management circuit is structured to transmit a remote alert received from the mesh network 115 to one or more equipment 105 for displaying the remote alert on a user interface (e.g., dashboard) of the equipment 105. The data management circuit 130 may include one or more circuits configured to monitor the state of the equipment 105 or other aspects of the equipment 105 with which the IoT module 110 is used.

Still referring to FIG. 1, the data management circuit 130 may further be configured to monitor other characteristics of the physically and communicably coupled equipment 105 by communicating with sensors and monitoring devices (e.g., fluid level sensors, temperature sensors, pressure sensors, chronometers). The data management circuit 130 may output data related to the information received from the sensors and monitoring devices to a display. For example, a display may be a user interface integrated into the equipment 105 or a display shown on a user interface of user device 120 or dashboard (e.g., dashboard of equipment 105). The display may therefore communicate to an OEM various operational data related to the equipment 105 and/or a power supply (e.g., a rechargeable battery) of the equipment 105. The data management circuit 130 may also be structured to transmit (e.g., via the network interface 125) an identifier of the equipment 105 physically and communicably coupled to the respective IoT module 110. In some embodiments, the identifier is a serial number or a product number. The illustration of the IoT module 110 is for illustrative purposes only and should not be regarded as limiting. In other embodiments, the IoT modules 110 include more or less components than shown in FIG. 1, for example, the IoT modules 110 may also include a small, rechargeable battery, a user interface, and/or an input/output (I/O) circuit. The IoT modules 110 can be removably or fixedly coupled to the equipment 105 and/or the battery pack used to power the equipment 105.

The equipment management system 100 also includes one or more pieces of equipment 105. In some embodiments, the equipment 105 include an extensive variety of products manufactured and/or rented by an OEM. The equipment 105 may include battery-powered or engine-powered outdoor and indoor equipment. In some embodiments, the equipment 105 may include hybrid power systems (e.g., operate on power from a battery and an internal combustion engine). For example, the equipment 105 may have a power supply of both a rechargeable battery and an internal-combustion engine. The equipment 105 further includes battery products, such as a rechargeable, portable battery pack (e.g., battery pack 600, shown in FIG. 6). Each of the equipment 105 may include a controller that is physically and/or communicably coupled to one of the IoT modules 110. The controller of the equipment 105 may receive a remote alert from the respective, coupled IoT module 110 for displaying the remote alert on a user interface (e.g., a dashboard or other type of display screen) of the equipment 105. In some embodiments, the IoT modules 110 are used with vehicles, such as a trailer or truck that transports a fleet of equipment 105. The IoT modules 110 may be installed on the equipment 105 proximate a portion of the main source of power for the equipment 105. For example, an IoT module 110 may be positioned on a deck of a lawn mower. In some embodiments, the IoT modules 110 may be integrated with a control circuit (e.g., an engine control unit) of the equipment 105.

Figure 2:
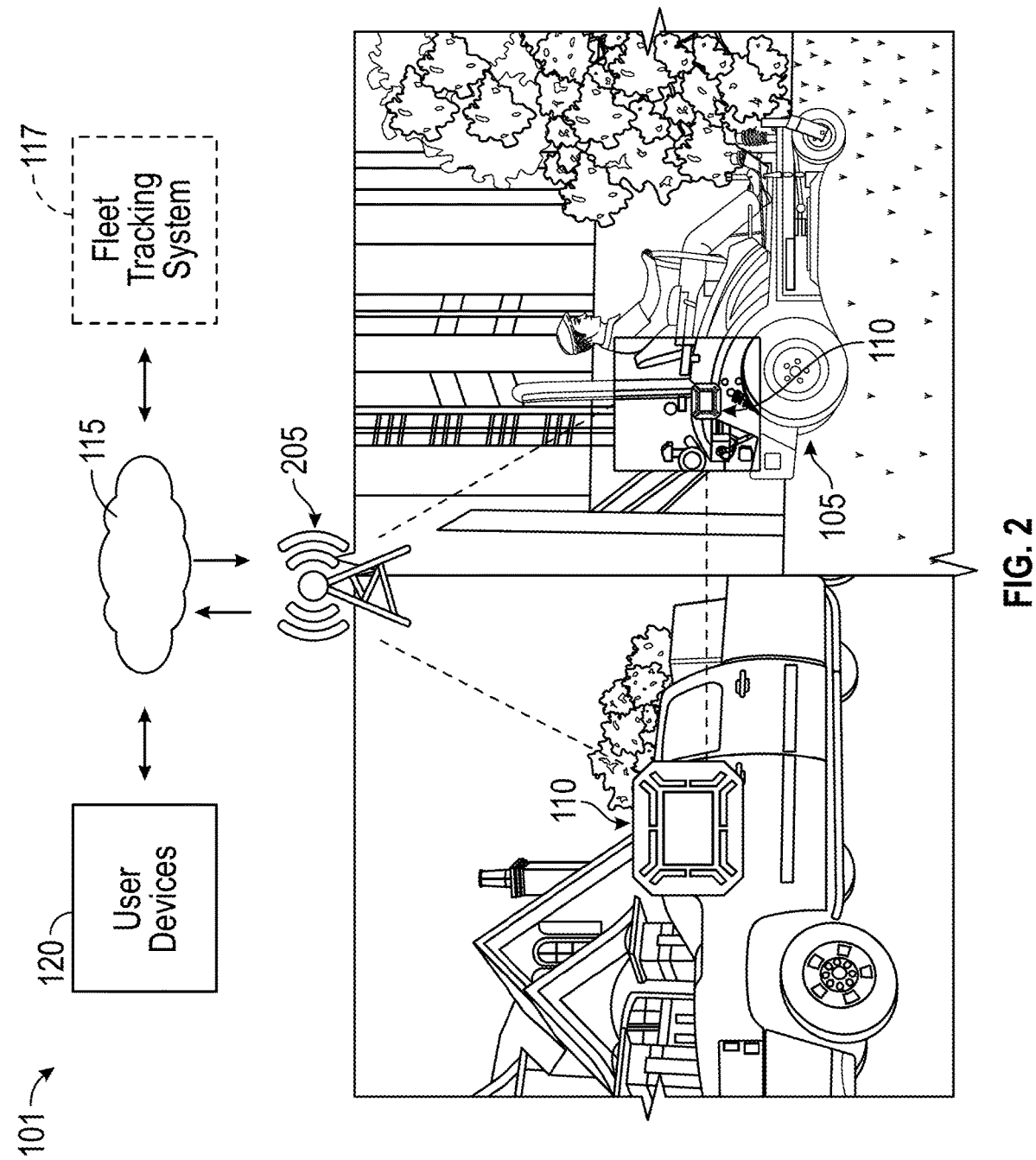
FIG. 2 is a perspective view of an equipment management system communicating over a mesh network to IoT modules of equipment.

Referring now to FIG. 2, an equipment management system 101 depicting IoT modules 110 and the interaction between the IoT modules 110 and the mesh network 115 is shown, according to some embodiments. The equipment management system 101 includes the IoT modules 110 positioned at a vehicle (e.g., truck, equipment trailer) and equipment 105 (e.g., an electric mower, a gas-powered mower), for example. In some embodiments, the IoT module 110 positioned at or in the truck is a gateway device (e.g., gateway device 113 (FIG. 3)). This gateway IoT module 110 may communicate with a cellular tower 205 (e.g., via the network interface 125 of the IoT module 110) to relay tracked data of each piece of equipment 105 that is linked to the truck. The IoT module 110 positioned and configured for the equipment 105 may be a less complex version of the gateway IoT module 110. For example, the IoT module 110 positioned on a mower includes less processing power and communication capabilities, described further below with reference to FIG. 3. Each of these IoT modules 110 may communicate to the gateway IoT module 110 within the truck, which may, via cellular transmissions, communicate the information to the cellular tower 205. The tracked data then can be uploaded in the cloud-based mesh network 115 and accessed by a fleet tracking system 117 and user devices 120. For example, a manager may view how long the equipment 105 was running (e.g., operated) at a jobsite via a client application on a user device 120 (e.g., personal computer). In some embodiments, the data in the mesh network 115 is processed and analyzed by third party services in the cloud-based mesh network 115. In some embodiments, the analyzed data is then communicated (e.g., via Wi-Fi, cellular communications) to the fleet tracking system 117 to visualize different aspects of the tracked fleet of equipment. For example, analyzed data is transmitted to a user device 120 to be displayed on a user interface of the user device 120.

Figure 3:
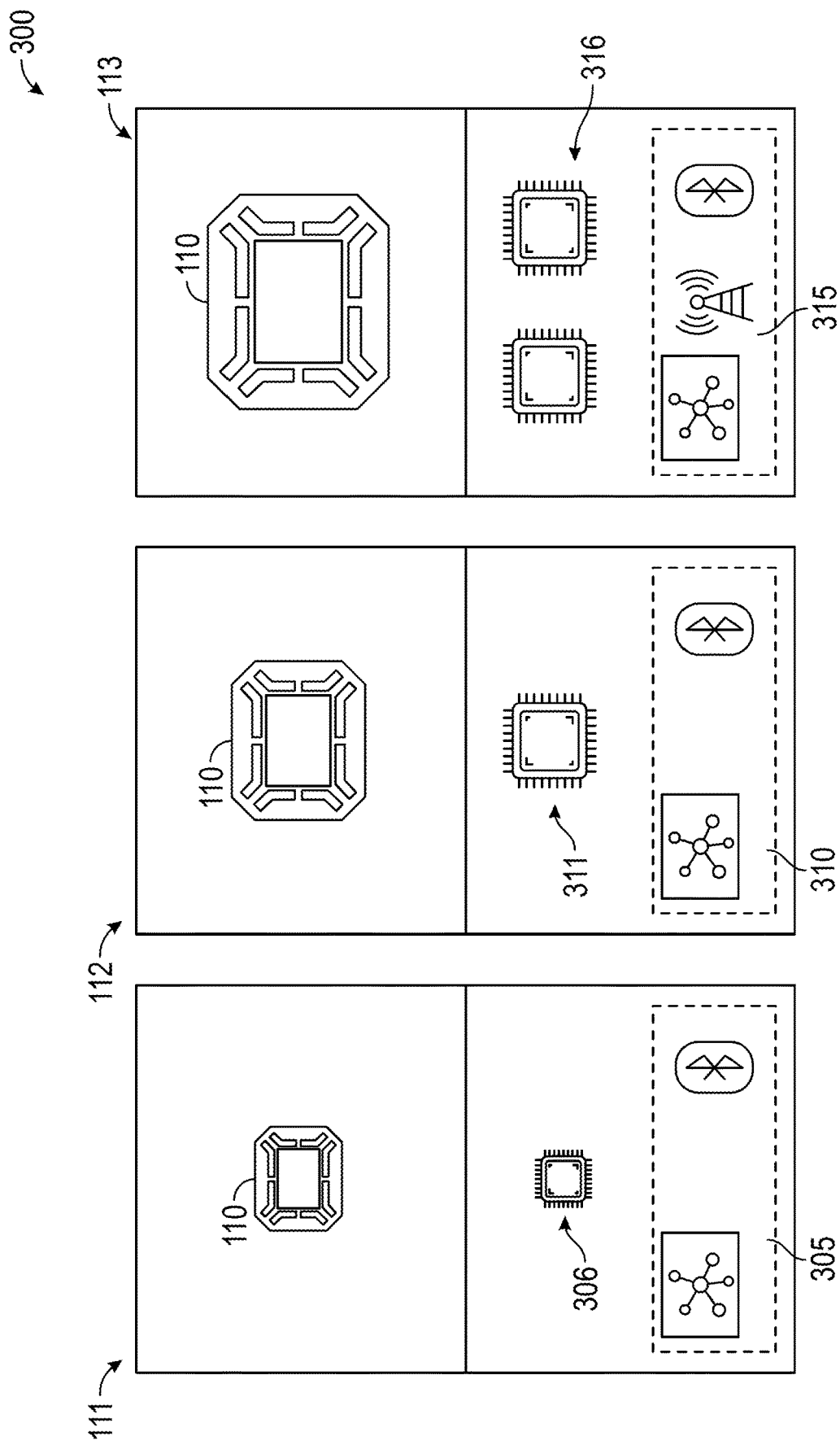
FIG. 3 is a schematic view of example configurations of the IoT modules.

FIG. 3. depicts a diagram 300 showing different configurations of the IoT modules 110, according to some embodiments. Diagram 300 includes an economical device 111, a mid-level device 112, and a gateway device 113, for example. In some embodiments, the economical device 111 utilizes less processing power 306 and has a simplified communication protocol 305. The communication protocol 305 of the economical device 111 may include Bluetooth protocols and mesh network protocols (e.g., Wirepas™). The communication protocol 305 can also include protocols to communicate over a 915-megahertz (MHz) spectrum, e.g., via a network interface 125 including a 915 MHz transceiver. The communication protocol 305 of the economical device 111 may not include cellular communication protocols. The economical device 111 can be used to collect and transmit information pertaining to the operation of the equipment 105. For example, the economical device 111 may store and transmit data on how many times the equipment 105 has started, how long the equipment 105 has operated (i.e., runtime), timestamps of when the equipment 105 was on/off, amount of growth in grass over time, predicted lifespan of a power supply of the equipment 105, and/or the load of the equipment 105 (e.g., load on an engine of the equipment 105). In some embodiments, the economical device 111 is used on more affordable equipment 105. For example, the economical device 111 may be used for push mowers, rather than a zero-turn-radius (ZTR) electric mower.

The mid-level device 112 has greater processing power 311 than the economical device 111. The mid-level device 112 can also be structured to include more memory storage than the economical device 111. In some embodiments, the mid-level device 112 is structured to have less processing power 311 than the processing power 316 of the gateway device 113. In some embodiments, the mid-level device 112 includes the same communication protocols 310 as the economical device 111. The mid-level devices 112 and the economical devices 111, using mesh network connections via communication protocols 305 and 310, transmit collected data to the gateway device 113. In some embodiments, each transmission to the gateway device 113 includes an identifier (e.g., a key) to associate the product (e.g., equipment 105) with the transmitted data. For example, an economical device 111 of a push mower may transmit a serial number or product number of the push mower, along with the operational data from the push mower, to the gateway device 113.

However, the gateway device 113 may include a different communication protocol 315. The communication protocol 315 can include Bluetooth protocols, mesh network protocols, and cellular communication protocols. The communication protocol 315 also can include protocols to communicate over WiFi and/or other internet connection mediums, such as LoRa communication. As such, the gateway device 113 can permit connectivity to the cloud-based IoT system of the mesh network 115. The gateway device 113 is configured to include a greater amount of processing power 316 and memory storage than the economical device 111 and the mid-level device 112. In some embodiments, the gateway device 113 also includes a global positioning system (GPS) sensor to track a location of the gateway device 113. An operator may choose to install the gateway device 113 on products with a greater cost or more sophisticated operation than products that the economical devices 111 and mid-level devices 112 are associated with in the equipment management system 100. For example, the gateway device 113 may be included on a ZTR mower, an equipment trailer, a light tower, batteries/battery packs, etc. In some embodiments, the gateway device 113, via cellular communications, transmits data received from economical devices 111 and mid-level devices 112 of products (e.g., equipment 105) to the cloud-based network. In some embodiments, the gateway device 113 transmits updated data to the network automatically after receiving new information from connected equipment 105 (e.g., via economical devices 111 and/or mid-level devices 112). The gateway device 113 may be configured to detect connectivity issues to the cloud-based network. In response to detecting an issue with connectivity to the cloud-based mesh network 115, the gateway device 113 may store updated data received from economical devices 111 and/or mid-level devices 112. Once connection to the network is restored, the gateway device 113 may then transmit data (e.g., operational data of equipment 105) to the cloud-based network, with a timestamp of when the data was first collected. In some embodiments, the gateway device 113 is configured to overwrite data saved in the local memory storage (e.g., memory 129) of the gateway device 113. For example, if there is no available memory in the local memory storage of the gateway device 113, the gateway device 113 may overwrite the most outdated information in the memory storage.

In an exemplary embodiment of a communication system in which the gateway device 113 may be used, a tracked fleet of equipment 105 communicates via Bluetooth with the gateway device 113 installed in a trailer. The tracked fleet of equipment 105 may include a push mower, a trimmer, and riding lawn mower, each with an endpoint device physically coupled on the equipment 105 (e.g., proximate an engine) that corresponds to the respective piece of equipment 105. The endpoint devices may include a vibration sensor, a communication device (e.g., a Bluetooth transceiver), and a battery. However, in some embodiments, the endpoint devices operate without being attached to a battery. The endpoint devices may communicate to the gateway device 113 over a Bluetooth link via the network interface 125 of the gateway device 113. The gateway device 113 then communicates with a cellular tower via cellular radio communications (e.g., via a cellular radio of the network interface 125 shown in FIG. 1). The data received from the gateway device 113 pertaining to the endpoint devices and the tracked equipment 105 may then be integrated seamlessly into a cloud for use in fleet tracking system 117.

Each configuration of the IoT modules 110 can detect another device when within range of each other. In some embodiments, the economical devices 111 and the mid-level devices 112 are configured to transmit information to the gateway device 113 for a tracked fleet of equipment 105. In some embodiments, the economical devices 111 and the mid-level devices 112 transmit tracked information to other economical devices 111 and/or mid-level devices 112 in the mesh network 115 of connected equipment 105. In other embodiments, the equipment management system 100 may include a different number of module components than the economical device 111, mid-level device 112, and gateway device 113 to scale the mesh network 115. For example, the equipment management system 100 may include only two module components (e.g., the mid-level device 112 and the gateway device 113, the gateway device 113 and the economical device 111) to reduce the amount of computing power or tracked information sent to the cloud-based network. In other embodiments, the equipment management system 100 may include more module components than those shown in FIG. 3. The depiction of FIG. 3 is for illustrative purposes only, and is not meant to be limiting in any regard.

Figure 4:
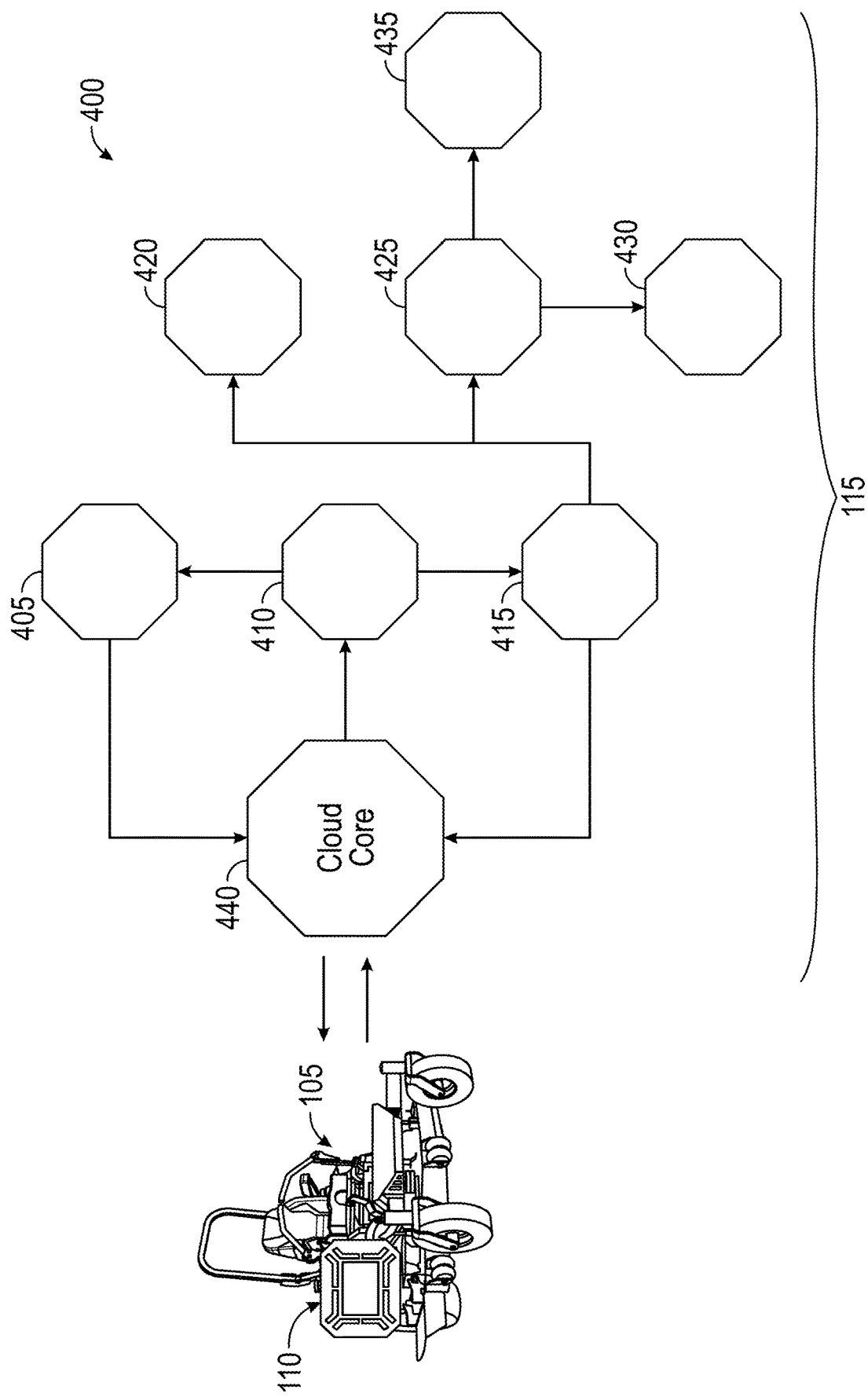
FIG. 4 is a schematic view of a diagram illustrating data flow from an IoT module to nodes in a cloud system of the mesh network.

Referring now to FIG. 4, a diagram 400 illustrating data flow from an IoT module 110 of a piece of equipment 105 to nodes in the cloud system of the mesh network 115 is shown, according to some embodiments. The mesh network 115 includes cloud-based IoT system with nodes 405, 410, 415, 420, 425, 430, 435, and 440, for example. In some embodiments, node 440 is a core cloud node that directly communicates with IoT module 110 (e.g., via cellular communications) to upload operational data of the equipment 105 to a cloud and disperse the information throughout the mesh network 115. Operational data may include runtime data of equipment 105, timestamps of operation of a power supply of the equipment 105, a predicted lifespan of the power supply, an amount of starts of the equipment 105, and/or a load of the equipment 105, for example. Node 440 may then transmit the operational data to be used by nodes of the cloud that run analytics algorithms on the data to determine useful information. For example, node 405 may run a third-party service, such as Google Cloud™ Cloud Functions, to determine updated device configuration data to pass down the mesh network 115 to node 440, and then to IoT module 110. In some embodiments, the nodes in the cloud perform machine-learning services that are trained by software that can analyze a large scale of data. For example, node 425 may run BigQuery™ software algorithms to analyze vast datasets of operational data, which is then transmitted to node 430. Node 430 may then run Google Cloud™ machine learning (ML) services, for example, or other machine learning techniques, to train models that are configured based on needs of the user of the data (e.g., an OEM that desires to improve efficiency of a tracked fleet of equipment 105). The analyzed data from the cloud, IoT system of the mesh network 115 may also be transmitted user devices 120 to be displayed on an interface (e.g., display screen) of the user device 120 (e.g., a cellphone of a manager of a tracked fleet of equipment 105).

Figure 5:
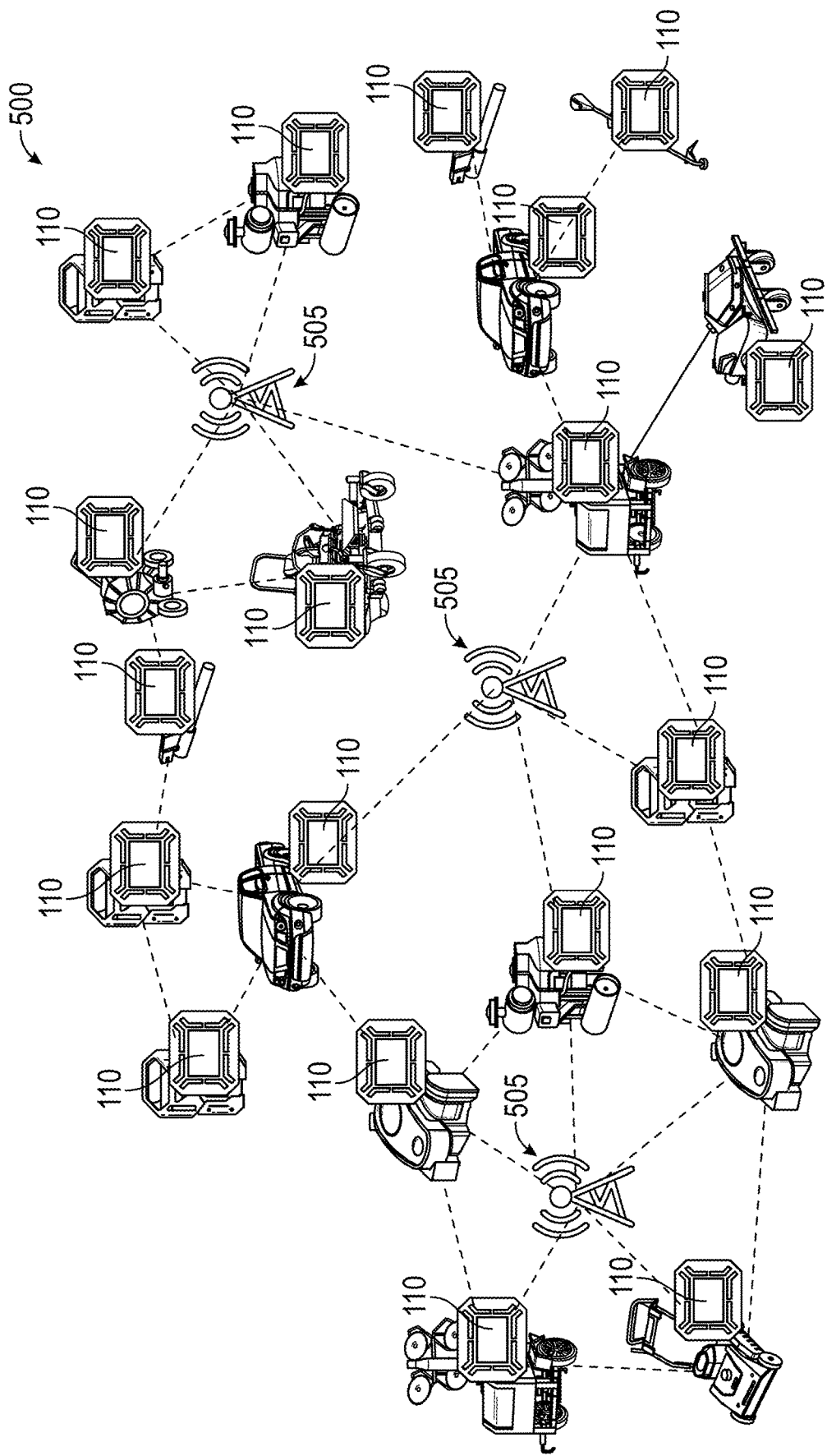
FIG. 5 is a schematic view of an equipment management system and the mesh network connection environment.

Turning now to FIG. 5, a mesh network connection environment 500 demonstrating a variety of products used with the IoT module 110 is shown, according to some embodiments. Each IoT module 110 that is communicably coupled with a cellular tower 505 may be a gateway device 113. Using the cloud-based, mesh network connection environment 500, customers can vastly scale connection and communication between products. Customers may use the mesh network connection environment 500 to share valuable information pertaining to each product associated with a point in the mesh network 115. By utilizing IoT in a cloud-based system, such as mesh network 115, OEMs can provide clients substantial benefits. For example, one possible benefit is battery specific data monitoring. Another advantage of the cloud-based IoT system of mesh network 115 is the ability to quickly transmit and update assignment of equipment 105 (e.g., tool and/or battery assignment). Tool and/or battery assignment can be advantageous when assigning equipment to specific jobs, while also managing several fleets of equipment with several crews operating the equipment. Additionally, data on workforce performance and tool specific data history can be tracked and transmitted throughout the mesh network 115. The mesh network 115 also permits the use of an IoT system with linked products and asset tracking. The IoT modules 110 integrated with the universal mesh network 115 can allow OEMs or customers to view and track the predicted life of power supplies of the equipment 105. In some embodiments, this is utilized to indicate how long a piece of equipment 105 will be able to operate. In some embodiments, this information can be useful for a rental system that provides batteries to operate battery-powered equipment 105.

Additionally, the equipment management system 100 allows the utilization of customizable, remote alerts in the mesh network connection environment 500. For example, remote alerts can be generated and transmitted throughout the mesh network 115 to notify operators or managers regarding the management of a fleet of equipment 105 (e.g., tools and/or batteries). An OEM may also utilize the system described herein for managing and updating new client data. In some embodiments, client data may include warranty data, customer usage information, data regarding the return on the investment of renting equipment 105 to the customer, etc. Furthermore, after renting equipment 105 and/or completing a job using one or more pieces of equipment 105, the equipment management system 100 may allow a user to create and share job-invoicing data. For example, when generating a client bill, tracked data, such as data regarding how long each piece of equipment was operated 105, how much charge remains on a rented battery, etc., can be used in determining the amount of the bill.

Another example of how the equipment management system 100 with mesh network connection environment 500 may be used by customers is the generation and transmission of smart downtime reminders. In some embodiments, at a predetermined time during the day, the equipment management system 100 detects whether a piece of equipment 105 is still running (i.e., operating). In response to detecting operation of the equipment 105, the equipment management system 100 may then generate a reminder to transmit, via the mesh network 115, to an operator and/or manager to power down the piece of equipment 105. Beneficially, the reminder may be sent to a piece of equipment 105 to be displayed on a user interface of the equipment 105 (e.g., a dashboard), or may be sent to a user device 120 of a manager and/or operator of the equipment 105. Thus, the efficiency and use of power sources to operate a fleet of equipment 105 can be improved, reducing any unnecessary use of resources to power equipment 105 that are not scheduled for operation. An additional possible advantage of equipment management system 100 includes tracking inventory of equipment 105 that are connected in the mesh network 115 via the IoT modules 110. Beneficially, this can decrease the risk of equipment 105 being stolen, lost, or left behind at a jobsite. Furthermore, by tracking inventory of equipment 105, a manager can predetermine whether each piece of equipment 105 needed at a jobsite is accounted for in a vehicle (e.g., transportation vehicle).

Figure 6:
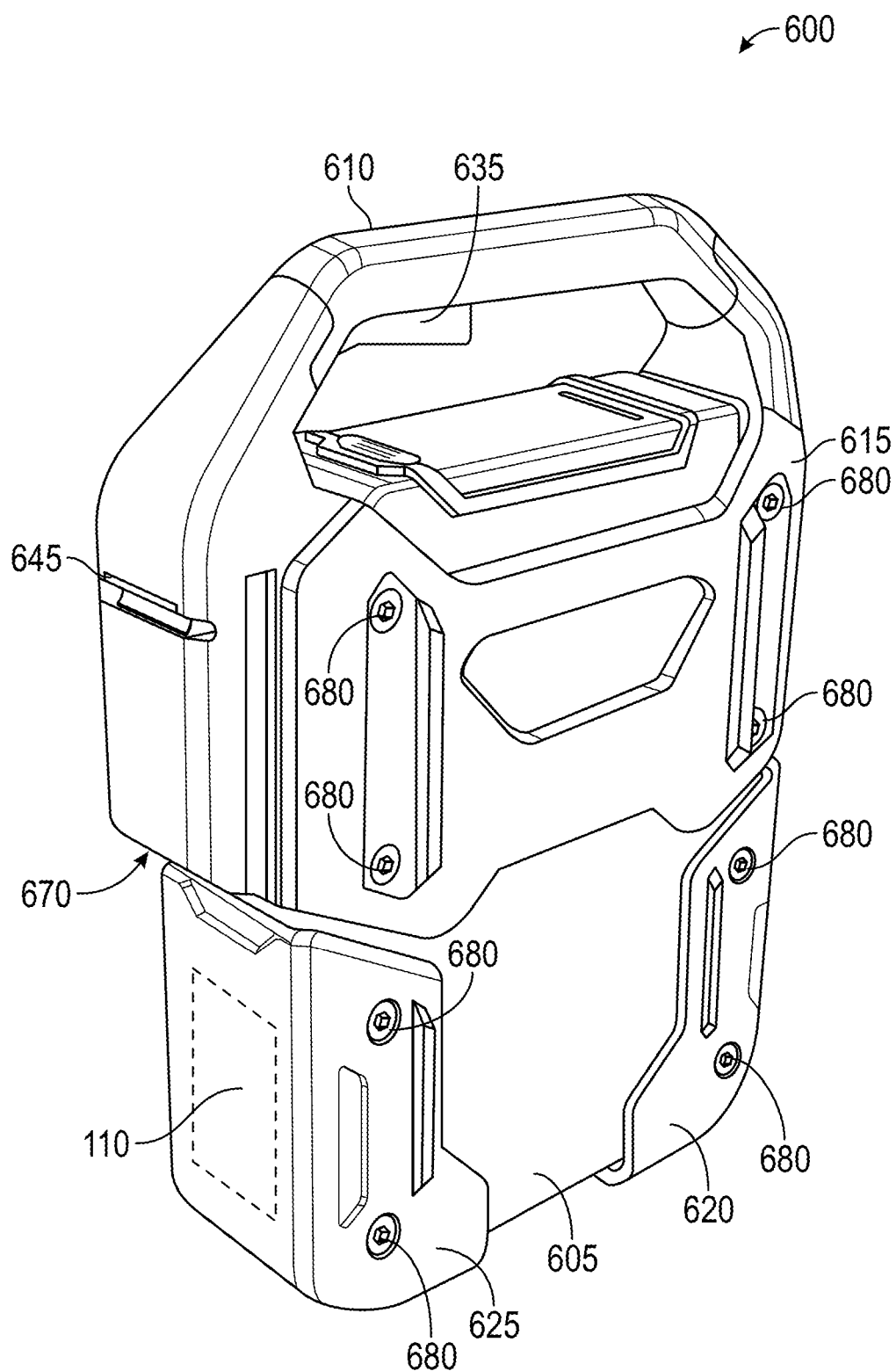
FIG. 6 is a perspective view of a battery incorporating an IoT module.
Figure 7:
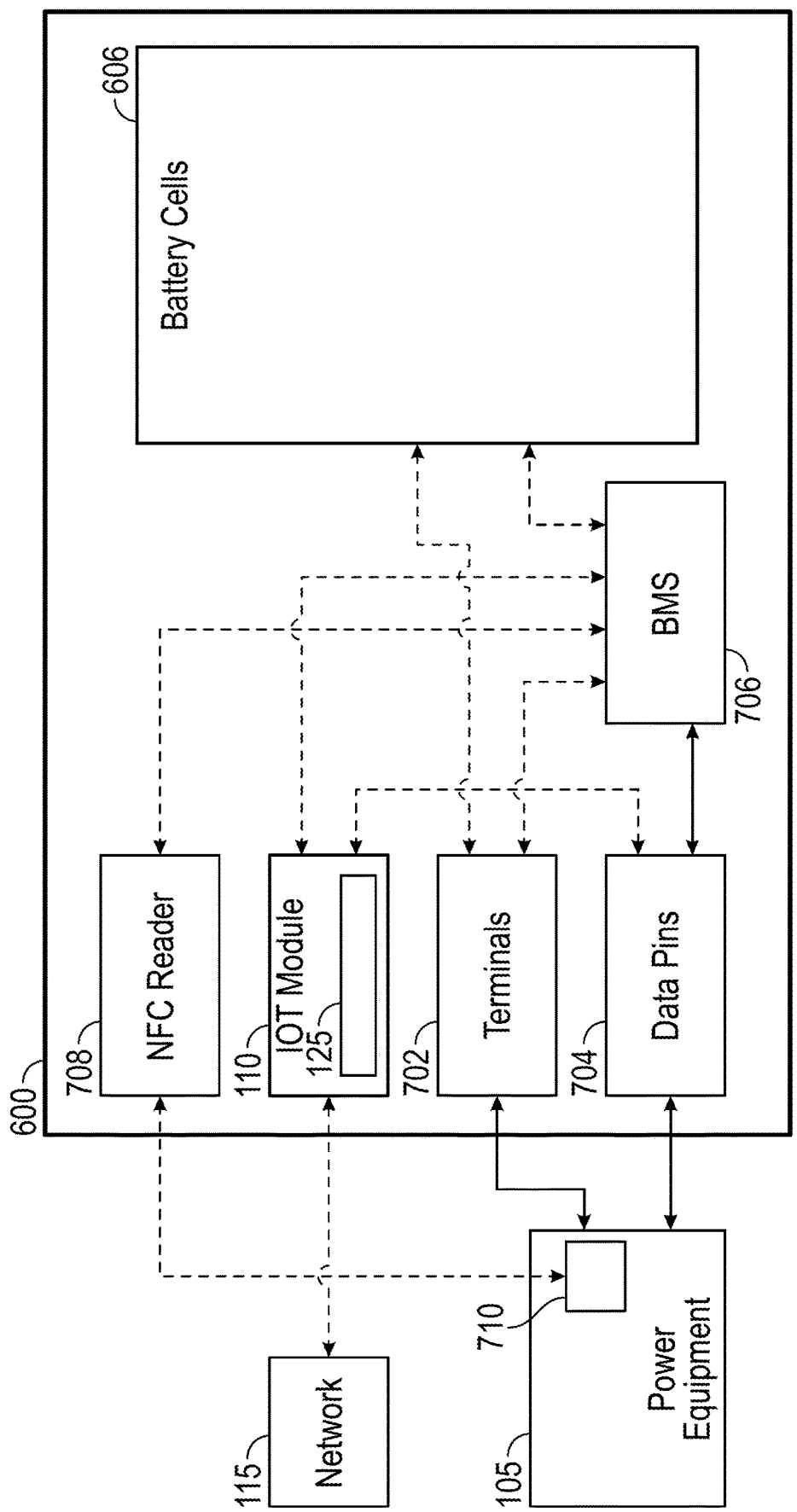
FIG. 7 is a schematic view of the battery of FIG. 6, detailing the IoT module and a battery management system.

Referring now to FIGS. 6-7, a battery pack 600 is depicted. The battery pack 600 can be considered equipment 105, for example. The battery pack 600 is removable and rechargeable, and is configured to be coupled to an equipment interface (e.g., to allow a removable coupling to a piece of power equipment). The battery pack 600 can be installed into a piece of equipment vertically, horizontally, and/or at any angle. The battery pack 600 includes a plurality of Lithium-ion battery cells received within a housing 605. However, other battery types are can be incorporated into the battery pack 600 as well, such as nickel-cadmium (NiCD), lead-acid, nickel-metal hydride (NiMH), lithium polymer, etc. The battery pack 600 yields a voltage of approximately 48 Volts (V) and 1400 Watt-hours (Wh) of capacity. It is contemplated that battery packs 600 of other sizes may also be used. The battery pack 600 is capable of approximately 2,000 charge/discharge cycles, approximately 5,000 W continuous power (13 Amps (A) per cell), 9,000 W peak power (25 A per cell), and 14,000 W instantaneous power (40 A per cell). The battery pack 600 in total weighs less than approximately twenty-five pounds, allowing for ease of portability, removal, and replacement. The battery pack 600 is also hot-swappable meaning that a drained battery pack 600 can be exchanged for a new battery pack 600 without completely powering down connected equipment. As such, downtime between battery pack 600 exchanges is eliminated.

The battery pack 600 can be removed by an operator from a piece of equipment (e.g., from a receiver of a piece of equipment) without the use of tools and recharged using a charging station, as described further herein. Accordingly, the operator may use a second rechargeable battery pack having a sufficient charge to power equipment while allowing the first battery to recharge. In addition, the battery pack 600 can be used on various types of equipment including indoor, outdoor, and portable jobsite equipment. Due to its uniformity across equipment, the battery pack 600 can also be used as part of a rental system, where rental companies who traditionally rent out pieces of equipment can also rent the battery pack 600 to be used on such equipment. An operator can rent a battery pack 600 to use on various types of equipment or vehicles the operator may own and/or rent and then return the battery pack 600 to be used by other operators on an as-needed basis. Furthermore, multiple battery packs 600 may be used in conjunction with each other to provide sufficient power to equipment that may require more than a single battery assembly.

The battery pack 600 is configured to be selectively and electrically coupled to a piece of equipment and/or a charging station using terminals 702 (e.g., positive and negative terminals 702, and data terminals/data pins 704) that extend outwardly from an opening 670 formed within the battery pack 600. The piece of equipment or charging station includes a receiver having electrical terminals that are selectively and electrically coupled to the battery pack 600 without the use of tools. For example, an operator may both insert (and electrically couple) and remove (and electrically decouple) the battery pack 600 from a piece of equipment (e.g., from terminals of a receiver) without the use of tools. The equipment interface and/or receiver may include a planar mounting surface having at least one aperture for receiving a threaded fastener and the equipment interface and/or receiver may be coupled to the piece of equipment via a threaded fastener.

Still referring to FIGS. 6-7, the battery pack 600 further includes an upper modular portion 615 coupled to the upper portion of the housing 605, and lower modular portions 620, 625 coupled to a lower portion of the housing 605 on each of the left and right sides. The upper modular portion 615 and lower modular portions 620, 625 are coupled to housing 605 using fasteners 680 (e.g., bolts, screws). The lower modular portions 620, 625 provide protection to the battery housing 605 (and cells 606) and act to absorb or limit the amount of force the battery housing 605 endures by dropping, etc. The upper modular portion 615 and lower modular portions 620, 625 are exchangeable and customizable such that an operator or original equipment manufacturer may choose a different design and/or color based on the type or make and model of the equipment with which the battery pack 600 is to be used. The upper modular portion 615 including the handle 610 and the lower modular portions 620, 625 can be removed from the battery housing 605. As such, in some embodiments, the battery pack 600 may not include the upper modular portion 615 and/or lower modular portions 620, 625 and may be permanently mounted to a piece of equipment 105. The battery pack 600 can include a handle 610 and release mechanism 635 that communicates with a latch 645 that enables the battery pack 600 to be quickly released from a coupling with a piece of power equipment or charger.

FIG. 7 depicts the internal structure of the battery pack 600. As depicted, the battery pack includes a variety of different equipment positioned within the battery housing 605. For example, the plurality of rechargeable battery cells 606 are positioned within the housing and configured to supply electrical power to the terminals 702 (e.g., a positive terminal and a negative terminal), which in turn can transmit electrical power through to the piece of power equipment 105 being powered by the battery pack 600. In some examples, the battery cells 606 are directly coupled to the terminals 702. Alternatively, the battery cells 606 can be coupled to a battery management system (BMS) 706, which monitors one or more of the terminals 702, power equipment 105, and battery cells 606 to determine whether electrical power should be transmitted from the battery cells 606 to the terminals 702. In some examples, the BMS 706 controls a series of switches (e.g., MOSFETs, transistors, solid-state relays, etc.) that serve as connectors between the battery cells 606 and the terminals 702. Accordingly, the BMS 706 can monitor various operational parameters of both the battery pack 600 and the equipment 105 and selectively enable and control electrical power transmission from the battery pack 600 to the power equipment 105.

The BMS 706 also communicates with data pins 704 to transmit information between the equipment 105 and the battery pack 600. The information transmitted over the data pins 704 can take a variety of forms, including operational data of the equipment (e.g., run-time, blade speed, equipment health status, temperature, location, etc.) and commands or instructions that may take the form of inputs received directly through the battery pack 600 (e.g., through an interface on the battery pack), from the IoT module 110, or from the BMS 706.

In some examples, the battery pack 600 further includes an NFC reader 708. The NFC reader 708 can scan and detect an NFC tag 710 that is positioned within the equipment 105. The NFC tag 710 can store various information about the piece of equipment 105, including unique identifying information (e.g., a serial number, code, etc.) about the specific piece of equipment, as well as an equipment type (e.g., ZTR, push mower, power washer, etc.). The NFC reader 708 can detect the information stored on the NFC tag 710 and then communicate the information from the NFC tag 710 to the BMS 706.

The BMS 706 can then package operational data received through the data pins 704 with the data from the NFC reader 708 to attribute operational data to the exact piece of equipment that generated the operational data. The packaged data (e.g., data packet) can then be sent from the BMS 706 to the IoT module 110 for transmission to the mesh network 115 using the one or more communication protocols (e.g., 915 MHz. Bluetooth, Wi-Fi, etc.) within the network interface 125. The data packet can further include operational data about the battery pack 600 itself. For example, data related to charge level, current draw, number of cycles, temperature, etc. can be included within the data packet. In some examples, one of the piece of power equipment 105 or the battery pack 600 further include a GPS that can also provide locational data for the piece of power equipment 105 to the mesh network 115. In some examples, some or all of the data received by the battery pack 600 through the data pins 704 is transmitted directly to the IoT module 110 for transmission. Accordingly, some or all of the data received from the power equipment 105 can bypass the BMS 706 and be immediately transmitted to the mesh network 115 through the network interface 125. In some embodiments, the NFC reader 708 is considered a part of the IoT module 110, and the IoT module 110 is configured to transmit both identification information and operational information directly from the data pins 704 through to the mesh network 115. In some examples, the data received by each of the NFC reader 710 and the data pins 704 is transmitted over a controller area network (CAN) communication protocol. The IoT module 110 can include a transceiver that is configured to interact with other devices within the network using this protocol. In some examples, the battery pack 600 is configured to receive operational data from the equipment 105 over a CAN bus.

The IoT module 110 can be hosted by one or both of the equipment 105 and the battery pack 600 (which can also be considered equipment 105, as depicted in FIG. 1). In some examples, the IoT module 110 is configured to be removable or readily installable onto a piece of equipment 105. Accordingly, existing equipment 105 can be retrofitted with IoT modules 110 to enable connectivity with the mesh network 115. In embodiments where the IoT module 110 is coupled to the equipment 105, the equipment 105 can provide operational data about the equipment 105, the battery pack 600, and the source of the information directly to the IoT module 110, so that the complexity of one of the components (e.g., the equipment 105 or the battery pack 600) can be reduced. In some examples, the IoT module is coupled to the equipment 105 but configured to be powered by battery power provided from the battery pack 600 through the terminals 702. In still other examples, the IoT module 110 includes a dedicated battery power source that is configured to operate independently of the battery pack 600.

As explained above, the IoT module 110 is configured to transmit data from the battery pack 600 and the equipment 105 powered by the battery pack 600 (or the equipment 105 only, if no battery pack 600 is present), as well as information received from other equipment within the mesh network 115. For example, and as explained above, various different classes of communication system may be used throughout the mesh network 115. In some examples, battery packs 600 and/or equipment 105 may be equipped with less communication transceivers. For example, one or more battery packs within the mesh network 115 may be equipped to communicate information only over Bluetooth. Accordingly, in order for the information from the battery pack or powered equipment without an IoT module to reach the mesh network 115, the data should be first transmitted to equipment 105 that includes an IoT module 110. The IoT module 110 can accordingly be configured to transmit information received both locally and externally through the network interface 125. The available processing power within the IoT module 110 can differentiate data received locally from data received externally, and can also be configured to provide a location stamp (e.g., from the GPS) to data received externally that does not include location information. Accordingly, at least an approximate location of the data source (e.g., the equipment location) can be packaged with the operational data and provided to the mesh network 115. In some examples, the IoT module 110 inspects data received from external equipment 105 and determines an appropriate action based upon the type or urgency of the associated data. For example, basic runtime data may be transmitted through the mesh network 115 differently (e.g., slower) than health status warnings or failure data, which may have a higher priority. In still other examples, nearby equipment 105 can communicate over the CAN bus to a singular and dedicated IoT module 110, which in turn packages and sends all of the operational data to the mesh network 115.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "coupled" and "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

What is claimed is:

1. A battery pack comprising:
    a housing;
    a plurality of rechargeable lithium-ion battery cells received within the housing;
    a positive terminal and a negative terminal in selective communication with the plurality of rechargeable lithium-ion battery cells and configured to transmit electrical power from the rechargeable lithium-ion battery cells to a piece of equipment coupled with the battery pack;
    a data terminal including a data pin configured to receive operational information from the piece of equipment coupled with the battery pack;
    a battery management system configured to monitor the plurality of rechargeable lithium-ion battery cells and selectively couple the plurality of rechargeable lithium-ion battery cells to the positive terminal and the negative terminal to selectively permit electrical power to flow from the rechargeable lithium-ion battery cells to the positive terminal and the negative terminal; and
    an Internet of Things (IoT) module in communication with the data terminal and the battery management system, the IoT module being configured to:
        receive operational information about the piece of equipment from the data terminal;

receive operational information about the rechargeable lithium-ion battery cells from the battery management system; and transmit the operational information about the piece of equipment and the operational information about the rechargeable lithium-ion battery cells via a network interface;

wherein the network interface is configured to communicate the operational information about the piece of equipment and the operational information about the rechargeable lithium-ion battery cells to a mesh network, wherein the network interface is configured to communicate over at least two different frequencies, wherein the battery pack further comprises a near field communication (NFC) reader, the NFC reader configured to detect information from an NFC tag on the equipment, wherein the IoT module is configured to transmit the information from the NFC tag with the operational information about the equipment.

2. The battery pack of claim 1, wherein the network interface includes transceivers configured to communicate over the at least two different frequencies, wherein at least one of the at least two frequencies corresponds with Bluetooth.

3. The battery pack of claim 2, wherein the network interface includes a transceiver configured to communicate using a frequency of 915 MHz.

4. The battery pack of claim 1, wherein the IoT module includes a processor, the processor being configured to receive the detected information from the NFC reader, associate the detected information from the NFC reader with the operational information about the equipment, and send a data packet including the detected information from the NFC reader and the operational information about the equipment through the network interface.

5. The battery pack of claim 1, wherein the NFC reader is in communication with the battery management system, and wherein the NFC reader is configured to transmit data to the battery management system and to the IoT module.

6. The battery pack of claim 1, wherein the battery management system is configured to receive the operational information about the equipment from the data terminal and transmit the operational information about the equipment to the IoT module.

7. The battery pack of claim 1, wherein the data terminal is configured to transmit information received by the data terminal directly to the IoT module.

8. The battery pack of claim 1, wherein the operational information about the rechargeable lithium-ion battery cells includes at least a current charge level.

9. The battery pack of claim 1, wherein the information from the NFC tag comprises at least one of unique identifying information about the piece of equipment or an equipment type.

10. The battery pack of claim 1, wherein the information detected by the NFC reader is transmitted over a controller area network (CAN) communication protocol.

11. A battery pack comprising:
a housing;
a plurality of rechargeable lithium-ion battery cells received within the housing;
a positive terminal and a negative terminal in selective communication with the plurality of rechargeable lithium-ion battery cells and configured to transmit electrical power from the rechargeable lithium-ion battery cells to a piece of equipment coupled with the battery pack;

a data terminal including a data pin configured to receive operational information from the piece of equipment coupled with the battery pack;

a battery management system configured to monitor the plurality of rechargeable lithium-ion battery cells and selectively couple the plurality of rechargeable lithium-ion battery cells to the positive terminal and the negative terminal to selectively permit electrical power to flow from the rechargeable lithium-ion battery cells to the positive terminal and the negative terminal; and an Internet of Things (IoT) module in communication with the data terminal and the battery management system, the IoT module being configured to:
receive operational information about the piece of equipment from the data terminal;
receive operational information about the rechargeable lithium-ion battery cells from the battery management system; and
transmit the operational information about the piece of equipment and the operational information about the rechargeable lithium-ion battery cells via a network interface;
wherein the network interface is configured to communicate the operational information about the piece of equipment and the operational information about the rechargeable lithium-ion battery cells to a mesh network, wherein the network interface is configured to communicate over at least two different frequencies,
wherein the network interface includes transceivers configured to communicate over the at least two different frequencies, wherein at least one of the at least two frequencies corresponds with Bluetooth.

12. The battery pack of claim 11, wherein the network interface includes a transceiver configured to communicate using a frequency of 915 MHz.

13. The battery pack of claim 11, wherein the battery management system is configured to receive the operational information about the equipment from the data terminal and transmit the operational information about the equipment to the IoT module.

14. The battery pack of claim 11, wherein the data terminal is configured to transmit information received by the data terminal directly to the IoT module.

15. The battery pack of claim 11, wherein the operational information about the rechargeable lithium-ion battery cells includes at least a current charge level.

16. The battery pack of claim 11, wherein the network interface further includes a cellular radio.

17. A battery pack comprising:
a housing;
a plurality of rechargeable lithium-ion battery cells received within the housing;
a positive terminal and a negative terminal in selective communication with the plurality of rechargeable lithium-ion battery cells and configured to transmit electrical power from the rechargeable lithium-ion battery cells to a piece of equipment coupled with the battery pack;
a data terminal including a data pin configured to receive operational information from the piece of equipment coupled with the battery pack;
a battery management system configured to monitor the plurality of rechargeable lithium-ion battery cells and selectively couple the plurality of rechargeable lithium-ion battery cells to the positive terminal and the negative terminal to selectively permit electrical power to flow from the rechargeable lithium-ion battery cells to the positive terminal and the negative terminal; and an Internet of Things (IoT) module in communication with the data terminal and the battery management system, the IoT module being configured to:
  receive operational information about the piece of equipment from the data terminal;
  receive operational information about the rechargeable lithium-ion battery cells from the battery management system; and
  transmit the operational information about the piece of equipment and the operational information about the rechargeable lithium-ion battery cells via a network interface;

wherein the network interface is configured to communicate the operational information about the piece of equipment and the operational information about the rechargeable lithium-ion battery cells to a mesh network, wherein the network interface is configured to communicate over at least two different frequencies, wherein the network interface includes a transceiver configured to communicate using a frequency of 915 MHz.

18. The battery pack of claim 17, wherein the battery management system is configured to receive the operational information about the equipment from the data terminal and transmit the operational information about the equipment to the IoT module.

19. The battery pack of claim 17, wherein the data terminal is configured to transmit information received by the data terminal directly to the IoT module.

20. The battery pack of claim 17, wherein the operational information about the rechargeable lithium-ion battery cells includes at least a current charge level.

* * * * *